United States Patent
Ellerbrok et al.

[11] Patent Number: 6,164,696
[45] Date of Patent: Dec. 26, 2000

[54] GAS BAG RESTRAINT SYSTEM

[75] Inventors: Norbert Ellerbrok, Alfdorf; Helmut Seibert, Mutlangen, both of Germany

[73] Assignee: TRW Occupant Restraint Systems GmbH & Co. KG, Alfdorf, Germany

[21] Appl. No.: 09/121,235

[22] Filed: Jul. 23, 1998

[30] Foreign Application Priority Data

Jul. 23, 1997 [DE] Germany ............ 297 13 112 U

[51] Int. Cl.⁷ .................................................. B60R 21/16
[52] U.S. Cl. ............................. 280/743.2; 280/729
[58] Field of Search ........................... 280/743.1, 743.2, 280/732, 728.1, 729

[56] References Cited

U.S. PATENT DOCUMENTS

| | | |
|---|---|---|
| 5,048,863 | 9/1991 | Henseler et al. ............ 280/743.1 |
| 5,333,903 | 8/1994 | Eyrainer et al. ............ 280/743.1 |
| 5,395,134 | 3/1995 | Gunn et al. ............... 280/743.1 |
| 5,584,508 | 12/1996 | Maruyama et al. ........... 280/743.1 |
| 5,732,973 | 3/1998 | Turnbull et al. ............ 280/743.1 |

*Primary Examiner*—Lanna Mai
*Assistant Examiner*—Lynda Jasmin
*Attorney, Agent, or Firm*—Tarolli, Sundheim, Covell, Tummino & Szabo L.L.P.

[57] ABSTRACT

A gas bag restraint system for vehicle occupants has a multi-stage gas generator and a gas bag which includes an outer wall having wall portions and having at least one fold which is formed by a first holding element. The gas bag is able to gradually take up various discrete inflation volumes in accordance with activated stages of the gas generator and dependent on an internal pressure of the gas bag. The outer wall has the at least one fold in a first, partially inflated state of the gas bag, after ignition of a first stage of the gas generator. In the first state, the outer wall has a portion defining an inflated region of the gas bag and a portion defined by the at least one fold. The fold in the first state is turned over toward the inflated region of the gas bag and is secured by the first holding element to the portion of the outer wall defining the inflated region for forming an inwardly extending pocket. The first holding element is destroyed after a predetermined first internal pressure of the gas bag has been reached.

13 Claims, 6 Drawing Sheets

GAS BAG RESTRAINT SYSTEM

FIELD OF THE INVENTION

The invention relates to a gas bag restraint system for vehicle occupants.

BACKGROUND OF THE INVENTION

Gas bag restraint systems with multiple-chamber gas bags for drivers and passengers are already known.

One possibility of providing first and second chambers consists in simply sewing together opposing wall portions of the gas bag by means of a tear seam and thereby producing a first and a second part which defines the wall of the first and the second chamber, respectively. The second chamber is completely separated from the first chamber. Only after reaching a predetermined internal pressure of the gas bag in the first chamber is the tear seam destroyed and gas flows into the second chamber. In this state, the two chambers communicate with each other, it also being possible that in so doing only one large chamber is produced. By providing a gas bag having several chambers, the size of the unfolded gas bag can be adapted to the respective situation in the case of restraint (e.g. to the intensity of impact, the position and the constitution of the vehicle occupant). Another possibility for providing a gas bag having several chambers consists, stated in simplified form, in arranging a small gas bag inside a larger gas bag and providing overflow openings in the wall of the smaller gas bag which are only opened after a predetermined internal pressure in the first chamber is reached. With the provision of two gas bags encased one in another, however, the expenditure for the manufacture of the gas bag is very great. With the provision of a gas bag with a taken-in region, the problem arises that on unfolding of only the first chamber, the outer wall for the second chamber strikes out toward the vehicle occupant in the manner of a whip and can lead to injuries.

SUMMARY OF THE INVENTION

The invention provides a gas bag restraint system with a gas bag which is able to be produced simply, which even with the inflation of only one chamber avoids in a simple manner a risk of injury to the occupant. The gas bag restraint system for vehicle occupants according to the invention includes a multi-stage gas generator and a gas bag which comprises an outer wall having wall portions and having at least one fold which is formed by a first holding means. The gas bag is able to gradually take up various discrete inflation volumes in accordance with activated stages of the gas generator and dependent on an internal pressure of the gas bag. The outer wall has the at least one fold in a first, partially inflated state of the gas bag, after ignition of a first stage of the gas generator. In the first state, the outer wall has a portion defining an inflated region of the gas bag and a portion defined by the at least one fold. The fold in the first state is turned over toward the inflated region of the gas bag and is secured by means of the first holding means to the portion of the outer wall defining the inflated region for forming an inwardly extending pocket. The first holding means is destroyed after a predetermined first internal pressure of the gas bag has been reached. The portion of the outer wall which is not or is not completely unfolded and which forms the fold, is thereby secured to the unfolded portion, whereby nondirectional movements of the outer wall, forming the fold, are prevented. The gas bag can, therefore, only have one outer wall, as in the known gas bag with a tear seam, which outer wall operates like a gas bag with several chambers by specific folding and fastening of the folded region. The invention provides in a simple manner a gas bag which is able to be manufactured at a favorable cost, because no complicated fabric patterns for the cutting thereof are necessary. It is also possible according to the invention to separate one chamber from another only by superimposed wall regions being secured to each other by holding means in such a way that one portion can not be unfolded. Closing off this region from the gas supply by tear seams, as was usual in the prior art, is therefore not imperatively necessary. A further advantage consists in that the sections of the outer wall which are to unfold in subsequent stages, in the first stage, i.e. when only one part is to be unfolded, lie inside the unfolded portion partly by provision of the pocket, and are thereby protected toward the exterior.

Preferably, the gas generator has at least first, second and third stages and releases the first holding means at the earliest from the second stage on. Thereby, in a simple manner, a very fine graduation of the restraining of the driver or of the passenger can be made possible. Three different stages can be achieved for example in that one charge with ⅓ the maximum total output and one charge with ⅔ the maximum total output are used, which total output is produced by simultaneous ignition of both charges. If the required restraining energy for the driver and the passenger is very low, only the first stage is ignited and only the first portion is unfolded. If somewhat more restraining energy is to be applied, the second stage also ignites, so that the first holding means is released, also the fold provided in the first state disappears and a gas bag with a greater volume is produced. If, finally, a high restraining energy is necessary, the highest output stage of the gas generator is ignited and the internal pressure of the gas bag is higher than with ignition of only the second stage. In so doing, the gas bag takes up the volume which is present on ignition also of the second stage. Thereby, in a simple manner, three different stages of restraint are possible.

According to a further development of the invention, a second holding means is provided, which is able to be released at a second, predetermined internal pressure of the gas bag and earlier than the first holding means. The second holding means secures portions of the outer wall to each other and can separate in terms of flow the portion of the outer wall formed by the fold, the gas bag being able to gradually take up an ever increasing volume upon releasing of the second and then of the first holding means.

The turned-over fold of the outer wall has a free edge and the outer wall near this free edge is secured by the first holding means to the portion of the outer wall which defines the inflated region.

In addition, the second holding means is preferably provided in the region of the inner end of the fold and permits a flow of gas into the fold only after ignition at the earliest of the second stage of the gas generator.

The gas bag restraint system according to the invention is not restricted to a gas bag which can take up only two different volumes in the inflated state. Rather, it is possible to produce in a simple manner a gas bag which can take up three or more different volumes.

For this, the gas bag has at least one further holding means, which is destroyed at an associated, predetermined internal pressure of the gas bag and which connects opposite portions of the outer wall defining the pocket with each other. The further holding means, in relation to the first state and to the pocket, is arranged between the first and the second holding means. It is preferably destroyed or released chronologically after the destruction of the first and second holding means. The term "destruction" in this connection is not limited only to the actual destruction of an object, but rather is intended to state that the holding means loses its function and no longer connects with each other the portions of the outer wall associated with it. The further holding means secures outer wall portions of the fold to each other and preferably separates a portion of the gas bag in terms of flow, which is only inflated after reaching the associated internal pressure of the gas bag. Consequently, several holding means are provided which are acted upon chronologically in succession with their associated gas bag pressure, so that the gas bag can be inflated to various volumes in various stages.

By the invention, it is achieved that no new design or fashioning of a gas bag is necessary. Single-chamber gas bags, known hitherto, can be used, which by folding and by the provision of holding means can be remodeled into gas bags which act like multi-chamber gas bags.

Preferably, the holding means are tear seams.

As already mentioned, the gas bag restraint system according to the invention can be constructed for the driver or for the passenger. If the gas bag is a driver's gas bag, in the fully inflated state it has a shape which is at least approximately circularly symmetrical to the central axis of the steering wheel, with a circumferential edge. For the formation of folds and pockets, the circumferential edge is pushed in toward the interior of the gas bag in several places. By this simple pushing in of the circumferential edge, any desired shapes of the gas bag are able to be achieved for the partially inflated state. For example, the first holding means can be a surrounding tear seam and the outer wall can have at least three layers which are connected with each other by the tear seam, with two of the at least three layers of the outer wall being formed by the pocket.

If the gas bag is a passenger's gas bag, the fold is preferably turned over from top to bottom in relation to the installed state. In the partially inflated state, the second holding means is arranged in the region of the upper end of the gas bag. In this design, the gas bag unfolds from below toward the vehicle occupant, whereby the risk of injury by the spreading gas bag is reduced.

DETAILED DESCRIPTION OF PREFERRED EMBODIMENTS

Figure 1:
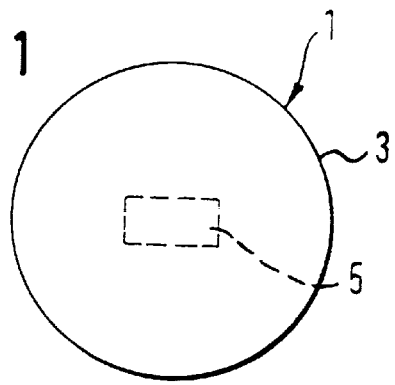
FIG. 1 shows a top view onto a completely unfolded driver's gas bag as part of a first embodiment of the gas bag restraint system according to the invention.

The invention will now be described in detail with reference to the embodiments shown in the drawings.

Figure 2:
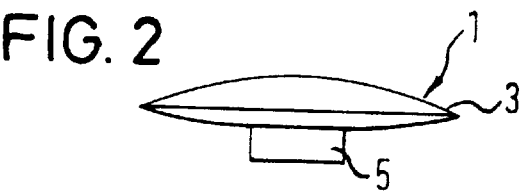
FIG. 2 shows a side view of the gas bag according to FIG. 1.

In FIGS. 1 and 2 a gas bag restraint system is shown for vehicle occupants, more precisely for a driver. The gas bag restraint system comprises a gas bag 1, with a circular cylindrical outer circumference in the fully inflated state, which is shown in FIG. 1. The gas bag itself is characterized by an outer wall 3 which has an inflation opening which is not shown, in the region of which a gas generator 5 is secured. The gas bag 1 can take up two different volumes in the case of restraint. In FIG. 1 the fully unfolded state is illustrated.

Figure 4:
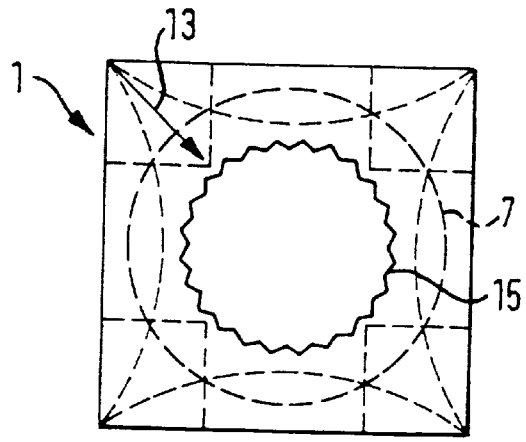
FIG. 4 shows a top view onto the gas bag illustrated in FIG. 3, in a partially folded state, which shows the successive folding operations.

The outer circumference of the gas bag 1 in partially unfolded state is illustrated in FIG. 4 by broken lines which are given reference number 7. Depending on factors such as the constitution of the vehicle occupant, his position in the vehicle and also the intensity of impact (all detected by corresponding sensors), the gas generator 5, constructed in three stages, is addressed accordingly, in order to provide a low, a medium or a high restraining energy. Thereby, the gas bag 1 is inflated into various stages which are characterized by a partial or complete unfolding, and also by different internal pressures of the gas bag.

Figure 3:
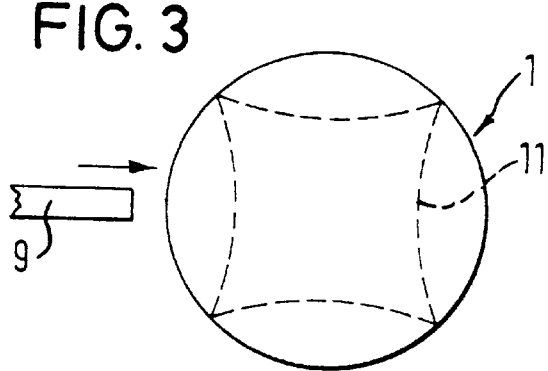
FIG. 3 shows a simplified illustration of the gas bag according to FIG. 1, with the aid of which the production of the gas bag is described which is able to be inflated to various volumes.

In order to realize these stages, the gas bag 1 is folded several times. By means of four fold tongues, of which only tongue 9 is shown, several regions of the gas bag on the outer circumference are pushed inwards (e.g. when the gas bag is partially or fully inflated), so that in each case an inwardly extending pocket is formed. The outer circumferential edge in the non-folded state, which has been pushed inwards during the first folding process, is given reference number 11 in FIG. 3 and is illustrated by broken lines. The folding illustrated in FIG. 3 can also be defined such that four folds are formed lying opposite each other in pairs, the inner end of which is formed by the circumferential edge and which are turned over radially outwards. The outwardly turned-over fold, as will be further explained hereinafter, is secured by holding means to the portion of the outer wall of the gas bag 1 which is completely unfolded in the partially inflated state.

After the first folding step, a gas bag is produced with an outer contour which is square in top view. The corners thus materializing are turned inward or folded, as is symbolized by the arrow 13 for the upper left-hand corner in FIG. 4. The inwardly turned or folded corners are illustrated separately again in FIG. 4 by broken lines. The thereby newly arising corners can be likewise turned inwards, which, however, is no longer illustrated. Due to these folds, an approximately circular contour of the thus folded gas bag is produced, the outer circumference of which is provided with the reference number 7. A circular circumferential seam 15 forms a first holding means which secures the folded regions of the gas bag to each other and to the upper face of the outer wall which in a partially inflated state defines the upper wall of the then present gas bag with a small volume. The circumferential seam, constructed as a tear seam, provides for the gas bag to be able to be partially inflated and in so doing being able to take up a smaller volume (characterized by the outer circumference 7).

The gas generator 5, as already stated, has three stages. Depending on how much restraint energy is required, three different stages can be ignited, which have the following characteristics:

1. Low Restraining Energy

Only the first stage is ignited. The gas bag unfolds so far that it takes up the outer circumference 7. The tear seam 15 remains intact. This state is designated the "first state" hereinafter.

2. Medium Restraining Energy

The internal pressure of the gas bag which is achieved by the gas generator by ignition of the second stage is so high that the tear seam 15 is destroyed and the gas bag is inflated up to the extent shown in FIG. 1. The gas bag accordingly takes up the maximum volume. However, the internal pressure of the gas bag is relatively low, so that the gas bag is relatively soft when the vehicle occupant falls into it.

3. High Restraining Energy

By ignition also of the third stage of the gas generator, an even greater quantity of gas is made available. The tear seam 15 is destroyed and the gas bag assumes the shape illustrated in FIG. 1, with the internal pressure of the gas bag being higher than in the case of medium restraining energy. The gas bag is accordingly hard and can therefore sufficiently restrain very heavy occupants even in the case of high impact intensity. Due to the various volumes and the various internal pressures of the gas bag, the gas bag can be adapted to the specific conditions in the case of restraint, which are dependent on the vehicle occupant and on the impact as such.

By specific folding and securing of the folded portion of the outer wall to portions of the outer wall which are unfolded after ignition of the first stage, gas bags which are already known can be remodeled to form a gas bag which is used in the gas bag restraint system according to the invention.

Figure 5:
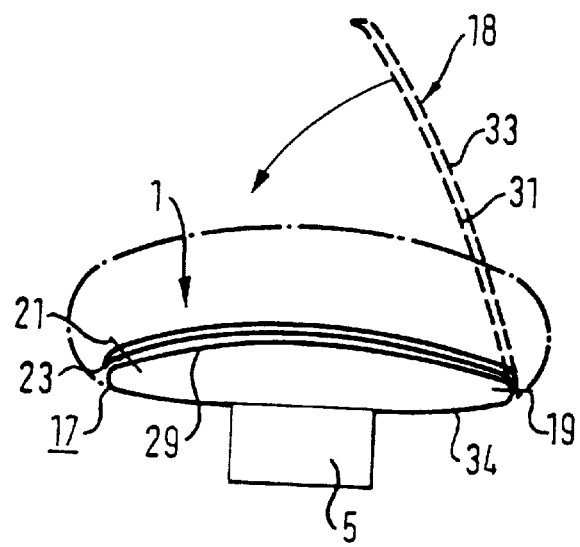
FIG. 5 shows a side view of a further embodiment of the gas bag restraint system according to the invention, with a driver's gas bag folded in a different way.
Figure 6:
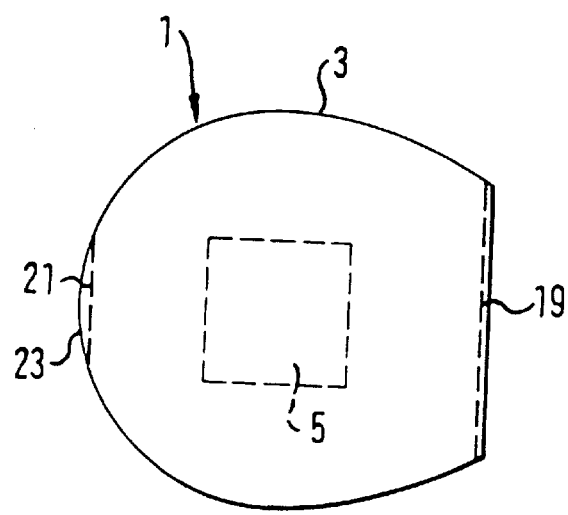
FIG. 6 shows a diagrammatic top view onto the partially unfolded gas bag according to FIG. 5, in the first state.

In the embodiment illustrated in FIGS. 5 and 6, various gas bag volumes are possible in the case of restraint by a different type of folding. FIG. 5 shows the smallest volume and, by dot-and-dash lines, the largest volume taken up by a driver's gas bag. FIG. 6 shows a top view onto the gas bag when it takes up the smallest of the three possible inflation volumes.

In FIGS. 5 and 6 a gas bag 1 is illustrated, which can be inflated by a three-stage gas generator 5 to different volumes, depending on the number of stages which are ignited. A marginal region of the gas bag 1 is folded up in such a way that opposite outer wall regions come to lie on each other and a fold 18 is formed. The fold 18 is formed by portions 31 and 33 of the outer wall and is separated in terms of flow from the remaining portion of the gas bag 1, which is given reference number 17, by a second holding means in the form of a second tear seam 19. Then, this separated fold 18 is turned over toward the remaining portion 17 (cf. arrow in FIG. 5) and is secured by the first tear seam 21 to the upper portion 29 of the outer wall 17. Thereby, a pocket is produced projecting into the interior of the gas bag in the first state, which pocket is defined by the portions 29 and 31 of the outer wall 3. The tear seam 21 lies here in the region of the free edge 23 of the turned-over fold. In the state shown in FIG. 5, in which the gas bag takes up a first volume and only the region 17 of the outer wall is unfolded, the fold 18 lies not quite taut against the portion 29 of the outer wall 3.

As an alternative to the folding method just described, one can also proceed as in the embodiment shown in FIGS. 1 to 4. For this, a fold tongue, not shown, can turn inwards a region of the outer wall, namely the pocket formed by the portions 29 and 31. The pocket is then secured at its inner end by the second tear seam 19 to the lower portion 34 of the outer wall 3, which portion adjoins the gas generator 5. Finally, the first tear seam 21 is applied.

The second tear seam 19 is already destroyed at an internal pressure of the gas bag which is less than the corresponding internal pressure of the gas bag which is necessary for the destruction of the first tear seam 21. In FIG. 6, the tear seams 19, 21 and also their position on the outer wall can be seen.

The gas bag restraint system shown in FIGS. 5 and 6 operates as follows:

In a case of restraint in which only a small amount of restraint energy is necessary the first stage of the gas generator 5 is ignited. The gas bag 1 assumes the shape shown in FIG. 5, in which it has a small volume which, however, is sufficient to restrain small, light vehicle occupants. In the first state, the outer contour of the gas bag is defined by the portions 34, 29 and the first tear seam 21. As the fold 18, which is taken in by the tear seam 19, is secured at its free end by the tear seam 21 to the portion 29, 34 of the gas bag, the taken-in portion defined by the fold can not move like a whip toward the vehicle occupant on inflation of the gas bag to the smaller volume and cause injuries to the occupant.

If, on the other hand, a medium restraining energy is necessary, the second stage of the gas generator 5 is also ignited and an internal pressure of the gas bag is produced which is sufficient to destroy the second tear seam 19. In this case, the fold 18 will disappear. The tear seam 21 is not destroyed on ignition of the second stage and it prevents the turned-over fold 18 from being released.

If a high degree of restraining energy is necessary, the stage of the gas generator 5 is ignited which produces the highest output. The gas bag then takes up the volume shown by dot-and-dash lines in FIG. 5, with the gas bag being harder than after ignition of the second stage.

Figure 7:
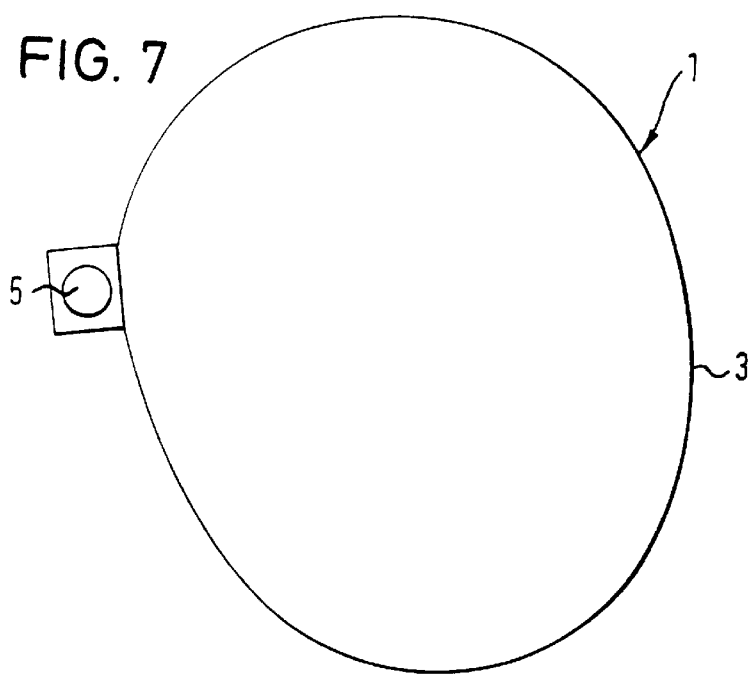
FIG. 7 shows an embodiment of the vehicle occupant restraint system according to the invention, with a completely unfolded passenger's gas bag.
Figure 8:
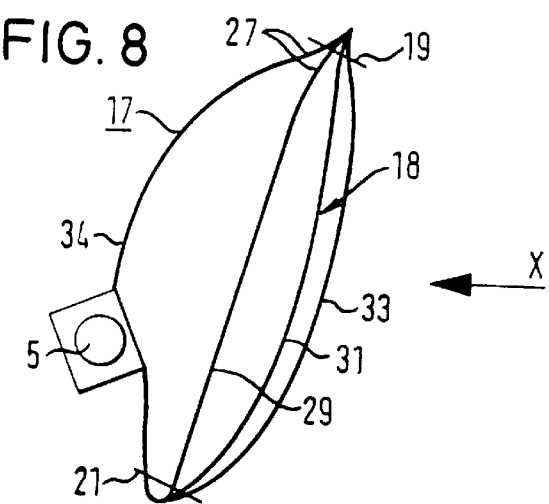
FIG. 8 shows the gas bag restraint system shown in FIG. 7 with a partially unfolded gas bag, in the first state.
Figure 9:
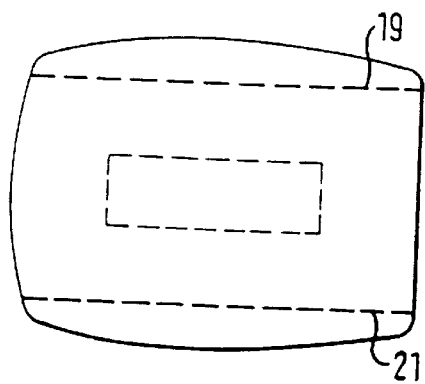
FIG. 9 shows a front view onto the passenger's gas bag in the state shown in FIG. 8.

In FIGS. 7 to 9, a passenger's gas bag 1 is shown in various stages of inflation and in various views. The type of folding and the number of different inflation volumes corresponds here to the embodiment shown in FIG. 5. In FIG. 7 in fully inflated state the gas bag 1 has a substantially cylindrical outer contour or a contour similar thereto. This is substantially because the illustrated peripheral surface is curved slightly outwards in a barrel shape. However, in contrast to the embodiment illustrated in FIG. 5, the tear seam 19 not only connects two or three layers of the outer wall with each other, but four. This quadruple layer consists of two double layers in each case, which are connected with each other. One double layer is formed by the fold 18 in the region of its inner edge, and the other double layer, which is given reference number 27, is formed by a taken-in edge which is provided on the edge of the portions 34 and 29. Likewise, the first tear seam 21 also connects four layers of the outer wall 3 with each other and not only three layers, as is shown in FIG. 5. In the embodiment shown in FIGS. 7 to 9, the production of the tear seams 19, 21 is very simple. Although the layers of the outer wall 3, indicated by reference numbers 19, 31 and 33, are illustrated spaced apart from each other in FIG. 8, they lie substantially adjacent to each other in the partially inflated state of the gas bag.

In the gas bag shown in FIGS. 7 to 9, the fold 18, in relation to the installed state, is turned over from top to bottom. The second tear seam 19 is thereby arranged in the region of the upper end of the gas bag in the partially inflated state shown in FIG. 5. The tear seams 19 and 21, in relation to the installed state, additionally extend transversely to the vehicle.

Figure 10:
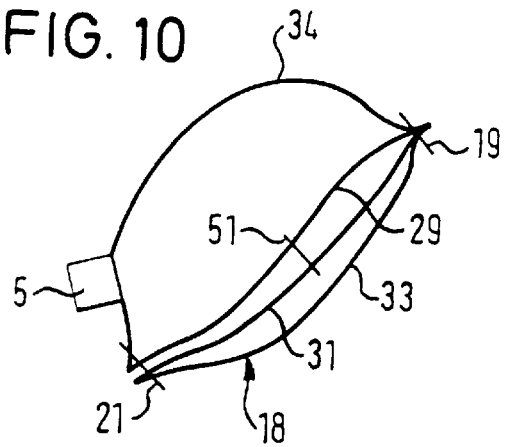
FIG. 10 shows a further embodiment of the gas bag restraint system according to the invention, in which the gas bag can take up four different volumes in the inflated state, FIG. 10 showing the smallest of the volumes, i.e. the first state.
Figure 11:
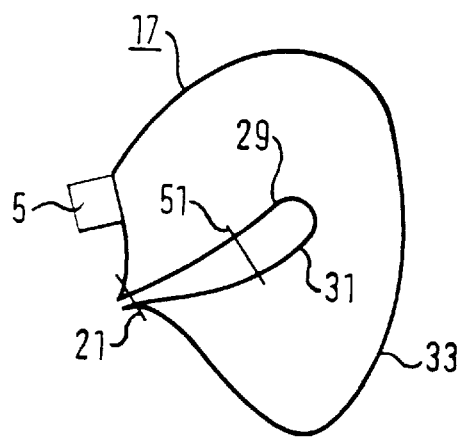
FIG. 11 shows the gas bag shown in FIG. 10, which has been inflated one stage further and takes up the next greater volume.
Figure 12:
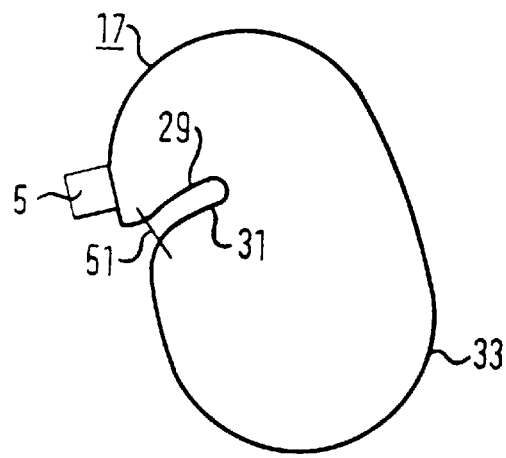
FIG. 12 shows the gas bag shown in FIGS. 10 and 11, which has been inflated one stage further compared with the state shown in FIG. 11, and takes up the second greatest volume.

In the embodiment illustrated in FIGS. 10 to 12, the gas bag can take up more than three, namely four different inflation volumes. The gas generator 5 in this case is constructed with at least four stages.

In the embodiment of a passenger's gas bag illustrated in FIG. 10, a further holding means is provided in the form of a third tear seam 51. The tear seam 51 connects opposite wall portions 29, 31 with each other which form the pocket and is arranged between the tear seams 19 and 21 in relation to the first state (FIG. 10) and to the pocket.

On ignition of the first stage (FIG. 10), the gas bag is only inflated to a relatively small volume. The gas bag shape is determined by the portions 34 and 29. The outer wall portion 33 does not lie taut, but rather with the formation of folds against the portion 31 which in turn lies against the portion 29.

On ignition of the second stage, the tear seam 19 is destroyed. A greater outer surface is available for the unfolding of the gas bag, which surface is partially formed by the portion 33 (FIG. 11).

On ignition of the third stage, the tear seam 21 is destroyed, so that the gas bag takes up the volume shown in FIG. 12. The tear seam 51 holds the outer wall portions 29 and 31 against each other.

Only on ignition of the fourth and last stage is the tear seam 51 finally destroyed, so that the gas bag takes up its maximum volume.

Figure 13:
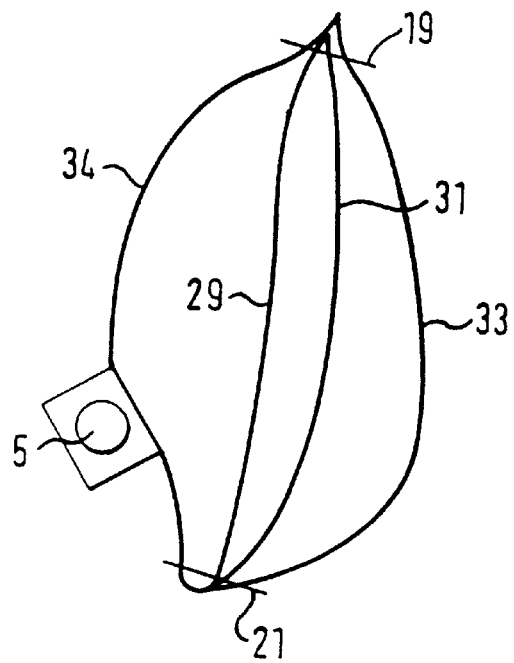
FIG. 13 shows a variant of the gas bag restraint system according to the invention which is slightly altered compared with the embodiment shown in FIG. 8, in which in the first state the portion of the outer wall of the gas bag forming the fold is also partially unfolded.

As an alternative to the embodiment shown in FIGS. 10 to 12, the tear seam 19 can also be designed so as to be gas-permeable (by a large stitch width or by sewing only over sections) so that, as indicated in FIG. 13, on ignition of the first stage two chambers are formed which are defined on the one hand by the outer wall portions 29, 34 and on the other hand by the outer wall portions 31, 33. In this case, the outer wall portion 33 would be in a taut, outwardly curved state and would have no folds. The pocket which is formed by the outer wall portions 29, 31 would act as a type of rebound strap which gives the gas bag a defined shape and which keeps a region of the outer wall nearer to one opposite than would be the case without a rebound strap in the inflated state.

Figure 14:
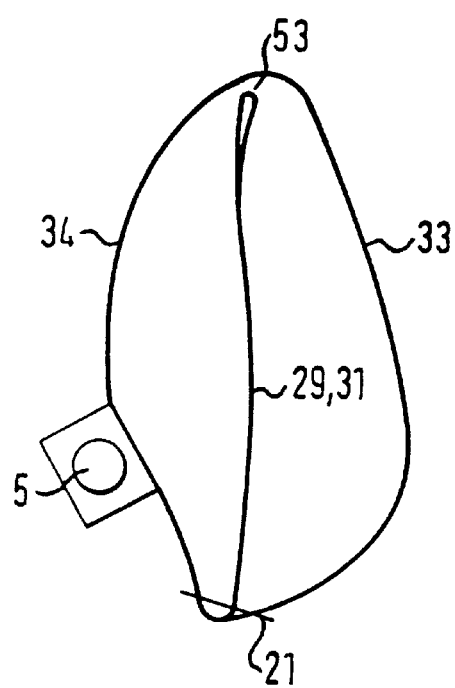
FIG. 14 shows an embodiment which is altered compared with FIG. 13, in which no second holding means is provided.

As a further alternative, according to FIG. 14 the tear seam 19 can also be eliminated, so that both chambers are connected with each other in the first state by means of a gas passage 53.

Figure 15:
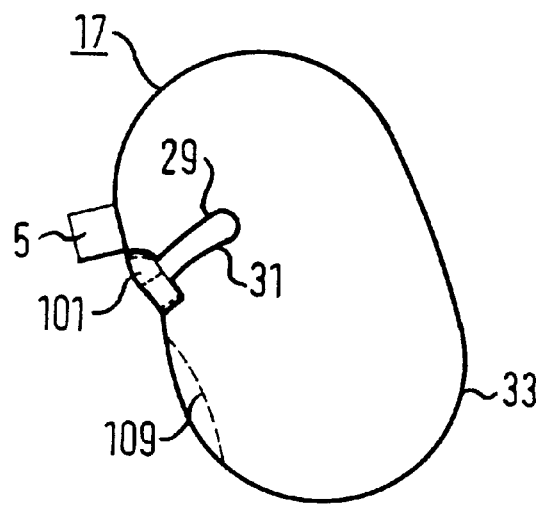
FIG. 15 shows a variant of the gas bag illustrated in FIG. 8, partially unfolded and including a different holding means.
Figure 16:
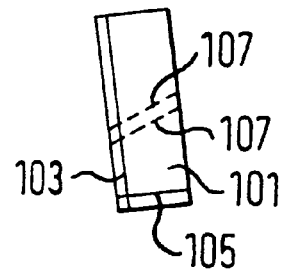
FIG. 16 shows an enlarged view of the holding means according to FIG. 15, which is configured as a fabric tab.

The gas bag 33 illustrated in FIG. 15 comprises a fabric tab 101 instead of a holding means configured as a tear seam. The fabric tab 101 has warp and weft threads 103 and 105, respectively, and connects the outer wall portions 31, 33 with each other by being sewn at two opposite ends to a respective one of the outer wall portions 31, 33. When a predetermined force is reached the fabric tab 101 is destroyed in a defined manner, this being achieved by means of a plurality of perforation lines 107. The individual cuts of the perforation lines 107 are offset relative to each other in such a way that each warp thread 103 is severed by at least one cut, something which also applies to the weft threads 105 in the region of the perforation lines 107. The force required for destroying the fabric tab 101 may thus be reduced and predefined within narrow limits.

Figure 17:
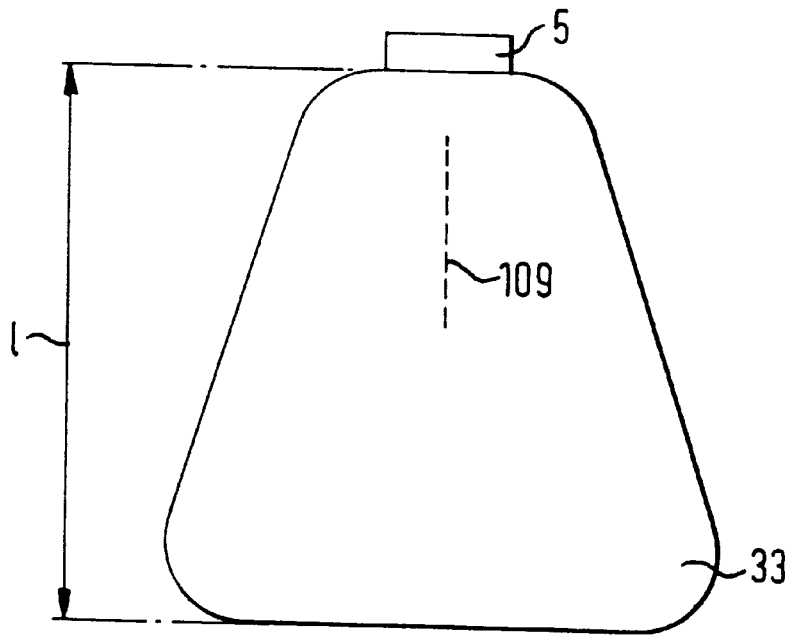
FIG. 17 shows a top view onto the gas bag according to FIG. 15.

A tear seam 109 provided on the rear side, as it were, of the gas bag reduces the gas bag volume, giving it a narrower shape in this region where it is supported on the dashboard during inflation. The reduction in volume permits faster unfolding toward the occupant. The overall length 1 as measured in top view (FIG. 17) is not shortened by the tear seam 109.

As an alternative, the holding means shown in FIG. 15 can be designed as a foil which also has perforations 107.

What is claimed is:

1. A gas bag restraint system for vehicle occupants, having a multi-stage generator and a gas bag which comprises an outer wall having wall portions and having at least one fold which is formed by a first holding means, said gas bag being able to gradually take up various discrete inflation volumes in accordance with activated stages of said gas generator and dependent on an internal pressure of said gas bag, said outer wall having said at least one fold in a first, partially inflated state of said gas bag, after ignition of a first stage of said gas generator, in said first state, said outer wall having a portion defining an inflated region of said gas bag and a portion defined by said at least one fold, said fold in said first state being turned toward said inflated region of said gas bag and being secured by means of said first holding means to said potion of said outer wall defining said inflated region for forming an inwardly extending pocket, and said first holding means being destroyed after a predetermined first internal pressure of said gas bag has been reached, and wherein a second holding means is provided which is destroyed at a second, predetermined internal pressure of said gas bag and earlier than said first holding means, and which secures portions of said outer wall to each other, said gas bag being able to gradually take up an ever increasing volume upon releasing of said second and then of said first holding means, and wherein at least one further holding means is provided which is destroyed at an associated, predetermined internal pressure of said gas bag and which connects opposite portions of said outer wall defining said pocket with each other and, in relation to said first state and to said pocket, is arranged between said first and second holding means.

2. The gas bag restraint system according to claim 1, wherein said further holding means is destroyed only after destruction of said first and second holding means in a stage following destruction of said first holding means.

3. A gas bag restraint system for vehicle occupants, having a multi-stage generator and
   a gas bag which comprises an outer wall having wall portions and having at least one fold which is formed by a first holding means,
   said gas bag being able to gradually take up various discrete inflation volumes in accordance with activated stages of said gas generator and dependent on an internal pressure of said gas bag,
   said outer wall having said at least one fold in a first, partially inflated state of said gas bag, after ignition of a first stage of said gas generator,
   in said first state, said outer wall having a portion defining an inflated region of said gas bag and a portion defined by said at least one fold,
   said fold in said first state being turned toward said inflated region of said gas bag and being secured by means of said first holding means to said potion of said outer wall defining said inflated region for forming an inwardly extending pocket, and
   said first holding means being destroyed after a predetermined first internal pressure of said gas bag has been reached, and
   wherein a second holding means is provided which is destroyed at a second, predetermined internal pressure of said gas bag and earlier than said first holding means, and which secures portions of said outer wall to each other, said gas bag being able to gradually take up an ever increasing volume upon releasing of said second and then of said first holding means.

4. The gas bag restraint system according to claim 3, wherein said gas generator has at least first, second and third stages and destroys said first holding means at the earliest from said second stage on.

5. The gas bag restraint system according to claim 3, wherein said second holding means separates said portion of said outer wall formed by said fold in terms of flow from said portion of said outer wall defining said inflated region.

6. The gas bag restraint system according to claim 5, wherein said second holding means is provided in a region of an inner end of said fold and permits a flow of gas into said fold only from ignition at the earliest of said second stage of said gas generator.

7. The gas bag restraint system according to claim 3 wherein a gas passage to said fold of said gas bag is present in said first state, so that said fold is partially inflated and at least two chambers are provided.

8. The gas bag restraint system according to claim 3, wherein said fold of said outer wall has a free edge and wherein said outer wall near said free edge is secured by said first holding means to said portion of said outer wall which defines said inflated region.

9. The gas bag restraint system according to claim 3, wherein said first holding means is destroyed after ignition at the earliest of said third stage of said gas generator.

10. The gas bag restraint system according to claim 3, wherein said outer wall comprises a quadruple layer which in turn consists of first and second double layers produced by folding said outer wall, and wherein either one of said first and second holding means fixes said quadruple layer of said outer wall to each other, said first double layer being formed by said fold and said second double layer being formed by a taken-in edge of said portion of said outer wall defining said inflated region in said first stage.

11. The gas bag restraint system according to claim 3, wherein said holding means are tear seams.

12. The gas bag restraint system according to claim 11 further comprising a vehicle having a longitudinal axis, wherein said gas bag is a passenger's gas bag and said tear seams, in relation to an installed state in said vehicle, extend substantially transversely to said longitudinal axis of said vehicle in said partially inflated state.

13. The gas bag restraint system according to claim 12, wherein, in relation to said installed state, said fold is turned from top to bottom and said second holding means in said first state is arranged in a region of an upper end of said gas bag.

* * * * *